US007211637B2

(12) United States Patent
Blok

(10) Patent No.: US 7,211,637 B2
(45) Date of Patent: May 1, 2007

(54) STERICALLY HINDERED REAGENTS FOR USE IN SINGLE COMPONENT SILOXANE CURE SYSTEMS

(75) Inventor: Edward J Blok, Wadsworth, OH (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 377 days.

(21) Appl. No.: 10/860,198

(22) Filed: Jun. 3, 2004

(65) Prior Publication Data

US 2005/0272881 A1 Dec. 8, 2005

(51) Int. Cl.
*C08G 77/08* (2006.01)
(52) U.S. Cl. .......................... 528/15; 528/31; 528/32; 524/588; 422/82.01
(58) Field of Classification Search ................ 528/15, 528/31, 32; 524/588; 422/82.01
See application file for complete search history.

(56) References Cited

U.S. PATENT DOCUMENTS

| | | | |
|---|---|---|---|
| 3,234,180 A * | 2/1966 | Wu ............................ | 528/31 |
| 3,539,530 A * | 11/1970 | Karstedt .................... | 524/261 |
| 3,699,073 A * | 10/1972 | Wada et al. ................ | 524/785 |
| 3,974,122 A * | 8/1976 | Sato et al. .................. | 524/500 |
| 4,329,275 A | 5/1982 | Hatanaka et al. | |
| 4,921,976 A | 5/1990 | Kabeta | |
| 5,169,909 A | 12/1992 | Okawa | |
| 5,370,936 A * | 12/1994 | Kaiya ......................... | 428/447 |
| 5,512,882 A * | 4/1996 | Stetter et al. ............... | 340/632 |
| 5,621,038 A | 4/1997 | Chen et al. | |
| 5,686,523 A | 11/1997 | Chen et al. | |
| 5,976,466 A * | 11/1999 | Ratner et al. ............ | 422/82.11 |
| 6,359,098 B1 | 3/2002 | Fehn et al. | |
| 6,518,371 B1 | 2/2003 | Fink et al. | |
| 6,710,123 B1 | 3/2004 | Amin-Sanayei et al. | |
| 6,840,069 B2 * | 1/2005 | France et al. ............. | 68/12.02 |
| 6,868,350 B2 * | 3/2005 | Zimmermann et al. ....... | 702/65 |
| 2002/0161140 A1 | 10/2002 | Yoneda et al. | |

FOREIGN PATENT DOCUMENTS

| EP | 0 363 006 A2 | 4/1990 |
|---|---|---|
| EP | 0 490 523 B1 | 6/1992 |
| EP | 1 215 248 A2 | 6/2002 |
| EP | 1 254 924 A1 | 11/2002 |

OTHER PUBLICATIONS

ASM International (Brinson, ed.),Engineered Materials Handbook, vol. 3 Adhesives and Sealants, (Dec. 1990) pp. 597-600.
Saruyama, et al., "Development of New Hydrosilylation Cure System with Microencapsulated Platinum Catalysts"; presented at Amer. Chem. Soc. Rubber Division, Anaheim, CA, (May 6-9, 1997) Paper 64.
Ganter, et al., "A New Generation of Addition Curing Silicone Heat Vulcanizing Rubbers", presented at Amer. Chem. Soc., Rubber Division Meeting, Cincinnati, OH, (Oct. 17-20, 2000) Paper 132.
Lewis et al., "Hydrosilylation Catalysts Derived from Cyclodextrin Organometallic Platinum Inclusion Compounds and Their Use in Command-Cure Applications" Journal of Inorganic and Organometallic Polymers vol. 6, No. 2, (1996) pp. 123-144.
Lewis, et al., "The Chemistry of Fumarate and Maleate Inhibitors With Platinum Hydrosilylation Catalysts" Journal of Organometallic Chemistry 521, (1996) pp. 221-227.
March, Advanced Organic Chemistry; Reactions, Mechanisms, and Structures, 4th ed., Wiley & Sons, New York (c.1992), pp. 275-277.
March, et al., Advanced Organic Chemistry; Reaction, Mechanisms, and Structures, 5th ed., Wiley & Sons, New York (2001), pp. 365-368.
Lewis et al., "Platinum-Group Metal Cyclodextrin Complexes and Their Use as Command-Cure Catalysts in Silicones" Journal of Inorganic and Organometallic Polymers vol. 5, No. 4, (1995) pp. 377-390.

* cited by examiner

*Primary Examiner*—Margaret G. Moore
(74) *Attorney, Agent, or Firm*—Harness, Dickey & Pierce, PLC

(57) ABSTRACT

A one-component or single component cure system for a polysiloxane product is provided. The cure system includes a siloxane reagent that has an unsaturated organic functional group for reacting with a crosslinking reagent. The cure system also has a crosslinking reagent that has a silicon hydride group for crosslinking with the unsaturated organic group of the siloxane reagent. Either the unsaturated functional group of the siloxane reagent, the silicon hydride group of the crosslinking reagent, or both are sterically hindered. The siloxane reagent and the sterically hindered silicon hydride crosslinking reagent are mixed together in the presence of a catalyst reagent to form the one-component cure system. Methods of making the polysiloxane product are also provided.

23 Claims, No Drawings

STERICALLY HINDERED REAGENTS FOR USE IN SINGLE COMPONENT SILOXANE CURE SYSTEMS

INTRODUCTION

The present invention relates to siloxane polymers, and more particularly to addition cure systems for siloxane polymers. Siloxane polymers (also known as "silicone" polymers) are stable polymers that are used for many different applications. Siloxane polymers can be formed by various reaction mechanisms which are divided generally into two classes: solvent borne (solvent dispersions of high molecular weight solids) and room-temperature vulcanizing (RTV). RTV materials are further divided into RTV-I and RTV-II categories. RTV-I is a siloxane curing system that cures upon exposure to water and is typically a one-part system. An RTV-II system is typically a two-component formulation that is generally capable of curing at room temperature when all the components are mixed. RTV-II is known as an addition-curing (or addition-crosslinking) mechanism. In addition-cure systems, siloxane materials crosslink by reaction of aliphatically unsaturated groups in polyorganosiloxanes with Si-bonded hydrogen (hydrosilylation) in the presence of a catalyst, typically a platinum compound. Once the essential components are introduced with one another, the crosslinking reaction starts immediately. Thus, addition cured silicone materials have been prepared almost exclusively as two-component formulations, which separate the crosslinker silicon hydrides (SiH) from the siloxane reactant materials having aliphatically unsaturated functional groups, to permit control over when the formation of the product occurs.

The use of two-component addition-crosslinkable silixone materials is associated with certain disadvantages, such as, for example, logistics and additional handling and mixing steps, as well as the need for additional manufacturing equipment. Also, after mixing of the separate components, the material only has a limited pot life at room temperature. This requires processing shortly after mixing, quality control of an additional mixing step, frequent cleaning of the storage container, metering units, and processing machines, for example, since the material remaining can set up/gel and adhere to the container walls.

Because of these disadvantages, there have been many attempts to provide addition-crosslinking silicone materials as a one-component system. Since all constituents required for the crosslinking are present together, various methods of suppressing premature crosslinking have been addressed. Inhibitor compounds that inhibit catalyst activity are currently used, and can be added to increase the pot life of an addition-crosslinking material system. Although the pot life can be increased as desired through the type and content of such inhibitors, the use of such inhibitors can result in a need to use far higher initiation temperatures, because the crosslinking rate is lowered at room temperature. Further, the final product may result in undercrosslinking or a low state of cure. Additionally, the use of inhibitor compounds adds to the cost of making siloxane materials, both through the expense of purchasing another ingredient, as well as additional handling and processing steps.

Other attempts at providing single component addition cure siloxane systems include encapsulating the platinum catalyst in a protective coating that does not break down until the mixture is heated. It has been found that such systems are costly, and that the catalyst does not distribute homogeneously throughout the mixture, and reduces efficiency. There is a need for a single addition cure polysiloxane system that is economical and can extend pot life after mixing to enable processing in an industrial practicable manner.

SUMMARY

In one aspect, the present invention comprises a single component addition curable polysiloxane system comprising a siloxane reagent having at least one unsaturated organic functional group for a crosslinking reaction; a crosslinking reagent comprising a silicon hydride group for the crosslinking reaction, wherein at least one of: the unsaturated organic functional group of the siloxane reagent, the silicon hydride of the crosslinking reagent, or both, are sterically hindered. The single component addition curable polysiloxane system also comprises a catalyst.

In another aspect, the present invention comprises a method of making a polysiloxane polymer by a single component addition cure. The method comprises: admixing a siloxane reagent comprising a siloxane polymer having a functional group for crosslinking, a crosslinking reagent comprising a silicon hydride functional group for crosslinking, and a catalyst into a single component mixture, wherein at least one of: the functional group of the siloxane reagent, the silicon hydride of the crosslinking reagent, or both, are sterically hindered. A crosslinking reaction is conducted between the siloxane reagent and the crosslinking reagent, where the sterically hindered functional group reduces a rate of the crosslinking reaction, as compared to a comparative crosslinking reaction rate of a comparative non-sterically hindered siloxane reacted with a non-sterically hindered crosslinking reagent.

In yet another aspect, the present invention provides a method of making a sensor film comprising: admixing together a siloxane reagent having a functional group for crosslinking, a crosslinking reagent comprising a silicon hydride functional group for crosslinking, wherein at least one of: the functional group of the siloxane reagent, the silicon hydride of the crosslinking reagent, or both, are sterically hindered, a catalyst, and a plurality of conductive particles to form a matrix mixture. The method further comprises reacting the siloxane reagent with the crosslinking reagent in a crosslinking reaction, wherein the sterically hindered functional group on the siloxane reagent, crosslinking reagent, or both, reduces a rate of the crosslinking reaction in the matrix mixture, as compared to a reaction rate of a comparative non-sterically hindered functional group of a siloxane reacted with a non-sterically hindered silicon hydride functional group of a crosslinking reaction. The matrix mixture is applied on a sensor probe and a polysiloxane matrix product is formed.

It has been discovered that compositions and methods of this invention afford advantages over siloxane addition curing systems and compositions used therein among those known in the art including one or more of the following: reduced initial crosslinking reaction rates, improved efficiency by elimination of two-component curing systems, improved control of crosslinking processes, improved processability, industrial efficiency, and practicability for addition cure siloxane systems. Further uses, benefits and embodiments of the present invention are apparent from the description set forth herein.

DESCRIPTION

The following definitions and non-limiting guidelines must be considered in reviewing the description of this invention set forth herein. The headings (such as "Introduction" and "Summary,") and sub-headings (such as "Polysiloxane Polymer Product", "Siloxane Reagent", "Crosslinking Reagent", "Catalyst" , "Additional Components", and "Methods") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof. Classification or discussion of a material within a section of this specification as having a particular utility is made for convenience, and no inference should be drawn that the material must necessarily or solely function in accordance with its classification herein when it is used in any given composition.

The citation of any references herein does not constitute an admission that those references are prior art or have any relevance to the patentability of the invention disclosed herein. Any discussion of the content of references cited in the Introduction is intended merely to provide a general summary of assertions made by the authors of the references, and does not constitute an admission as to the accuracy of the content of such references. All references cited in the Description section of this specification are hereby incorporated by reference in their entirety.

The description and any specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations the stated of features. Specific Examples are provided for illustrative purposes of how to make and use the compositions and methods of this invention and, unless explicitly stated otherwise, are not intended to be a representation that given embodiments of this invention have, or have not, been made or tested.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word 'include," and its variants, is intended to be non-limiting, such that recitation of items in a list is not to the exclusion of other like items that may also be useful in the materials, compositions, devices, and methods of this invention.

As referred to herein, all compositional percentages are by weight of the total composition, unless otherwise specified.

"About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

The present invention provides a one-component or single component cure system to form a siloxane polymer product. Curing systems which introduce all of the reactants simultaneously in a substantially single step, are generally known in the art as being a "one-component" or "single component" curing system. One aspect of the present invention is a reduced rate of reaction for the crosslinking/curing reaction that enables the single component curing system. A reduced reaction rate translates to a longer duration for processing, than was previously possible with prior art cure systems (i.e., where the functional group on either the siloxane reagent, crosslinking reagent, or both, is not sterically hindered).

The present invention thus provides a single component addition curable polysiloxane system comprising: a siloxane reagent having at least one unsaturated organic functional group for a crosslinking reaction; a crosslinking reagent comprising a silicon hydride functional group for the crosslinking reaction; and a catalyst, wherein at least one of: the unsaturated organic functional group of the siloxane reagent, the silicon hydride functional group of the crosslinking reagent, or both, are sterically hindered. While not limiting to the mechanism by which the present invention operates, it is believed that the sterically hindered functional group on the unsaturated organic functional group, silicon hydride functional group, or both functional groups, provide a steric bulk via the side groups near either the Si—H bond of the hydride, or the Si—CH=CH2 bond of the unsaturated vinyl group, which creates an energy activation barrier that reduces the rate of the crosslinking reaction. Hence, the slower reaction rate permits the simultaneous combination of the reagent materials and then the subsequent processing of the materials at a significant duration of time later. This is in contrast to traditional two-component systems (having a non-sterically hindered reagents), where the crosslinking reaction occurred too rapidly to permit admixing and any substantial delay in processing prior to forming the final polysiloxane product. Thus, in accordance with the principles of the present invention, the single component curable polysiloxane system can be processed and manipulated for a significant time after admixing the reagent components with one another, which provides significant manufacturing benefits, by eliminating dual component systems and the attendant mixing and processing systems.

Polysiloxane Polymer Product

The addition cure systems of the present invention preferably form a polysiloxane polymer product. "Polysiloxane" as used herein, refers to a cross-linked polymer that has a basic backbone of silicon and oxygen with organic side constituent groups that may be the same or different, generally described by the structural repeating unit —[O—Si (RR')]$_n$—, where R and R' may be the same or different side constituent groups, and n may be any value above 2 designating the repetition of the structural repeating unit (SRU) in the polymer backbone. The SRU is one means of expressing the polymer structure of a polymer of unspecified length, and generally cites one or more multivalent radicals of regular substitutive nomenclature, where the multivalent radical is generally prefixed by "poly", as recognized by one of skill in the art. Further, siloxane polymers are also known in the art as "silicone" polymers. Preferred siloxane polymers are crosslinked and encompass homopolymers and copolymers. The term "copolymer" generically refers to a polymeric structure that has two or more monomers polymerized with one another, and includes polymers such as terpolymers with three combined monomers. A "homopolymer" refers to a polymer comprised of a single monomer. Siloxane polymers may include polyheterosiloxanes, where side groups and/or structural repeating units may be different entities (having different side constituent groups), such as, for example, the siloxane co-polymer described by the nominal SRU formula, —[(O—SiRR'))$_n$—(O—Si(R" R'"))$_m$], wherein R and R' are distinct side groups from R" and R'". Further R and R' may be different from one another, likewise the same may be true for R" and R'".

As discussed above, the polysiloxane polymer products according to the present invention are preferably formed by an addition curing mechanism, where a cross-linking reaction occurs by the addition reaction of a hydride-functionalized cross-linking reagent across the vinyl group (hydrosilyation) of the siloxane reagent, which are typically facilitated by metal catalysts or metal catalyst complexes.

Siloxane Reagent

According to certain embodiments of the present invention, a "siloxane reagent" is generally defined as a siloxane polymer having at least one unsaturated organic functional group for reacting with the crosslinking reagent in a crosslinking reaction. The siloxane reagent polymer has a basic backbone of silicon and oxygen with organic side constituent groups that may be the same or different, generally described by the structural repeating unit —O—Si (RR')$_n$—], where R and R' may be the same or different side constituent groups, and n may be any value above 2 designating the repetition of the SRU in the polymer backbone. Within the siloxane reagent polymer, it is preferred that at least one of the side constituent groups is a functional group capable of reacting in a subsequent crosslinking reaction. In certain preferred embodiments of the present invention, the siloxane polymer has an unsaturated organic functional group for crosslinking with a hydride group via a hydrosilyation mechanism, which generally corresponds to a hydrocarbon functional group comprising an unsaturated carbon-carbon bond, such as that in an alkene or alkyne. Preferred functional groups in the siloxane reagent are unsaturated alkenes that have a vinyl group comprising a carbon-carbon double bond. Thus, one example of a siloxane reagent useful with the present invention is expressed by the SRU [—O—Si(CH$_3$)(CHCH$_2$)— where R$^1$ is selected to be an ethyl group (HC=CH$_2$), containing a vinyl group and R$_2$ is a methyl group (CH$_3$). In one embodiment of the present invention, the siloxane reagent is added to the one-component cure system as a non-sterically hindered siloxane reagent, where the unsaturated organic functional group is non-sterically hindered. In such embodiments, it is preferred that at least some portion of the crosslinking reagent silicon hydride is sterically hindered.

In another embodiment of the present invention, the unsaturated organic functional group of the siloxane reagent is sterically hindered. By "sterically hindered" it is meant that a steric effect occurs in the molecule arising from the crowding of substituent groups on the molecule near the silicon atom in the silicon-carbon bond of the vinyl group. In particular, steric effect is recognized as a change in steric energy between the reactants and products, which translates to a change in a reaction rate. With the present invention, the desired steric effect is steric reduction or hindrance. The impact of steric hindrance on reactivity is generally divided into three major types of effects, inductive (polarization), resonance, and steric. In most cases, two or three of the effects are operating within the molecular structure to promote steric hindrance, and it is difficult to identify precisely which of the three effects impacts the observed change in reaction rate. While not limiting to the mechanism by which the present invention operates, it is generally believed that be attaching physically large or bulky substituent groups either to the same silicon atom (the same silicon atom that is bonded to the functional group for crosslinking) or to adjacent silicon atoms in the crosslinking reagent molecule, the bulky groups physically hinder access of external reactive groups to the reactive functional group, thus resulting in a reduced reaction rate. Additionally, the bulky groups may alter reactivity of the reactive functional group (e.g., vinyl group) through inductance or resonance. In accordance with the principles of the present invention, the rate of reaction for crosslinking is significantly reduced, thus prolonging a duration of time available for processing after admixing the reagents with one another.

According to certain embodiments of the present invention, the siloxane reagents having a sterically hindered unsaturated organic functional group may be incorporated into a siloxane (having a backbone of alternating silicon-oxygen atoms). In certain alternate aspects, the siloxane reagent optionally comprises a silane in addition to a siloxane, where the silane (having a backbone of bonded silicon atoms) has an unsaturated organic functional group. In one embodiment, the SRU for the sterically hindered unsaturated organic (vinyl) group of the siloxane reagent has the nominal general formula:

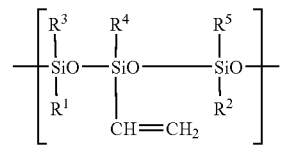

wherein R$^1$ and R$^2$ each comprise a non-reactive bulky organic substituent group. By "bulky" it is meant that the organic group comprises 3 or more carbon atoms. In certain embodiments, the bulky organic group comprises less than about 20 carbon atoms. In various embodiments, the organic group comprises from 3 to 20, from 4 to 15 or from 5 to 10 carbon atoms. Also, it is preferred that the organic group is non-reactive, in that is does not have a reactivity that would interfere or react with the functional group on the siloxane reagent. It is preferred that R$^1$ and R$^2$ are independently selected one another. In some embodiments, R$^1$ and R$^2$ are distinct and different organic groups, and in other alternate embodiments, R$_1$ and R$_2$ are the same organic group.

R$_1$ and R$_2$ are preferably selected from the group consisting of: substituted or unsubstituted linear alkyls, branched alkyls, aryls, aromatics, and mixtures thereof. Particularly preferred non-reactive organic groups comprise propyl, butyl, pentyl, hexyl, heptyl, octyl, nonyl, decyl, phenyl, alkylphenyl, cyclopentyl, and phenylpropyl. Where the bulky organic groups R$^1$ and R$^2$ are substituted, the side substituent groups may incorporate polar atoms or molecules, for example, such as fluorine, chlorine, bromine, oxygen, nitrogen, or sulfur, so long as the organic group remains non-reactive with the functional group of the siloxane. Examples of such non-reactive substituted bulky organic groups comprise butylated aryloxypropyl, N-pyrrolidonepropyl, cyanopropyl, benzyltrimethyl ammonium chloride, and hydroxyalkyl.

Additionally, $R^3$, $R^4$, and $R^5$ are each independently selected from the group consisting of: non-reactive organic groups and hydrogen. As appreciated by one of skill in the art, depending on the desired rate of reaction and system design, if $R^4$ is selected to be hydrogen, $R^3$ and $R^5$ may be selected to be bulky non-reactive organic groups as described above, thus providing a sterically hindered hydride on a di-functional silicon molecule having a sterically hindered vinyl, or in the alternative, more traditional smaller organic groups, which may accelerate the overall cross-linking rate.

In another embodiment of the present invention, the sterically hindered vinyl is represented by the formula:

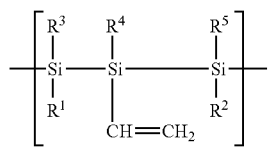

where the backbone of the molecule is a silane, and $R^1$ and $R^2$ comprise a non-reactive organic group having 3 or more carbon atoms. In certain embodiments, the non-reactive organic group comprises less than 20 carbon atoms. In certain embodiments, the bulky organic group comprises less than about 20 carbon atoms. In various embodiments, the organic group comprises from 3 to 20, from 4 to 15 or from 5 to 10 carbon atoms. $R^1$ and $R^2$ are independently selected in the same manner as described in the embodiment immediately above, and can be selected from the group consisting of: substituted and unsubstituted linear alkyls, branched alkyls, aryls, aromatics, and mixtures thereof. Likewise, $R^3$, $R^4$, and $R^5$ are independently selected from the group consisting of: non-reactive organic groups and hydrogen.

Further, vinyl functional groups can be incorporated either into a terminal end of the molecule, or alternatively within the moleculer backbone, as shown in the previous two embodiments. Thus, in another embodiment, the sterically hindered vinyl is located at the terminal end of a molecule in the siloxane reagent, and can be represented by the general formula:

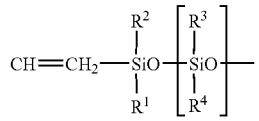

where $R^1$ and $R^2$ comprise a non-reactive organic group having 3 or more carbon atoms. In certain embodiments, the non-reactive organic group comprises less than 20 carbon atoms. In certain embodiments, the bulky organic group comprises less than about 20 carbon atoms. In various embodiments, the organic group comprises from 3 to 20, from 4 to 15 or from 5 to 10 carbon atoms. The selection of $R^1$ and $R^2$ is identical to that described in the previous embodiments, and $R^1$ and $R^2$ are independently selected from the group consisting of: substituted and unsubstituted linear alkyls, branched alkyls, aryls, aromatics, and mixtures thereof. Additionally, each respective $R^3$ and $R^4$ is independently selected from the group consisting of: non-reactive organic groups and hydrogen. In the present embodiment, the bulky organic substituent groups provide physical blocking of the vinyl, however are attached to the same silicon atom to which the vinyl is bonded.

As appreciated by one of skill in the art, any of the previously described embodiments of the sterically hindered unsaturated organic functional groups of the siloxane reagent molecules can be mixed with one another to form a mixture of different molecules, that ultimately form the siloxane reagent, that will react with the silicon hydride functional group on the crosslinking reagent. Additionally, depending on the system design, more traditional siloxane reagent compounds (those that are non-sterically hindered) may be added in low concentrations to the sterically hindered siloxane reagent to accelerate the crosslinking reaction rate. Also, as recognized by one of skill in the art, at least some portion of the siloxane reagent having an unsaturated organic functional group, at least some portion of the crosslinking reagent having a silicon hydride functional group, or both, have sterically hindered functional groups, which can be used for optimizing the rate of the crosslinking reaction. Preferably, the siloxane reagent is added to the one-component curing system at a concentration of about 1 to about 75 percent of the total weight, excluding fillers or additives.

Incorporation of bulky non-reactive organic side groups into the siloxane reagent molecules of the present invention are created by polymerization performed in a conventional manner, as recognized by one of skill in the art. Such a silicon molecule, having the two bulky side group in near proximity to the vinyl group, is preferably functionalized by incorporating a reactive functional group (e.g. epoxy, amine, mercapto, methacrylate/acrylate, acetoxy, chlorine; hydride or vinyl; or hydroxyl groups) to facilitate incorporation into the silicone based backbone by polymerization, such as by conventional methods known in the art. After the bulky non-reactive side groups are incorporated into the molecule, the newly formed sterically hindered unsaturated organic functional group can serve as the siloxane reagent in the addition cure single component system.

Crosslinking Reagent

Crosslinking by addition cure (e.g., hydrosilylation) requires a crosslinking (curing) reagent and a catalyst, in addition to the siloxane reagent. The crosslinking reagent preferably reacts with accessible functional groups on at least some of the unsaturated functional side groups within the siloxane reagent. In certain embodiments of the present invention, preferred crosslinking reagents comprise a crosslinking compound include a silicon hydride functional group that is sterically hindered.

According to certain embodiments of the present invention, the crosslinking reagents having a sterically hindered silicon hydride may be incorporated into a silane (having a backbone of bonded silicon atoms) or siloxane (having a backbone of alternating silicon-oxygen atoms). In one embodiment, the SRU for the sterically hindered hydride of the crosslinking reagent has the nominal general formula:

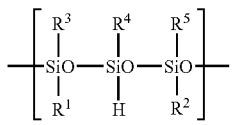

wherein $R^1$ and $R^2$ each comprise a non-reactive bulky organic substituent group. By "bulky" it is meant that the organic group comprises 3 or more carbon atoms. In certain embodiments, the bulky organic group comprises less than about 20 carbon atoms. In certain embodiments, the bulky organic group comprises less than about 20 carbon atoms. In various embodiments, the organic group comprises from 3 to 20, from 4 to 15 or from 5 to 10 carbon atoms. Also, it is preferred that the organic group is non-reactive, in that is does not have a reactivity that would interfere or react with the functional group on the siloxane reagent. It is preferred that $R^1$ and $R^2$ are independently selected one another. In some embodiments, $R^1$ and $R^2$ are distinct and different organic groups, and in other alternate embodiments, $R_1$ and $R_2$ are the same organic group.

$R_1$ and $R_2$ are preferably selected from the group consisting of: substituted or unsubstituted linear alkyls, branched alkyls, aryls, aromatics, and mixtures thereof. Particularly preferred non-reactive organic groups comprise propyl, butyl, pentyl, hexyl, heptyl, octyl, nonyl, decyl, phenyl, alkylphenyl, cyclopentyl, and phenylpropyl. Where the bulky organic groups $R^1$ and $R^2$ are substituted, the side substituent groups may incorporate polar atoms or molecules, for example, such as fluorine, chlorine, bromine, oxygen, nitrogen, or sulfur, so long as the organic group remains non-reactive with the functional group of the siloxane. Examples of such non-reactive substituted bulky organic groups comprise butylated aryloxypropyl, N-pyrrolidonepropyl, cyanopropyl, benzyltrimethyl ammonium chloride, and hydroxyalkyl.

Additionally, $R^3$, $R^4$, and $R^5$ are independently selected from the group consisting of: non-reactive organic groups and hydrogen. As appreciated by one of skill in the art, depending on the desired rate of reaction and system design, if $R^4$ is selected to be hydrogen, $R^3$ and $R^5$ may be selected to be bulky non-reactive organic groups as described above, thus providing another sterically hindered hydride on a di-functional silicon molecule, or in the alternative, more traditional smaller organic groups, which may accelerate the overall cross-linking rate.

In another embodiment of the present invention, the sterically hindered hydride is represented by the formula:

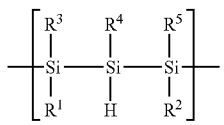

where the backbone of the molecule is a silane, and $R^1$ and $R^2$ comprise a non-reactive organic group having 3 or more carbon atoms. In certain embodiments, the non-reactive organic group comprises less than 20 carbon atoms. In certain embodiments, the bulky organic group comprises less than about 20 carbon atoms. In various embodiments, the organic group comprises from 3 to 20, from 4 to 15 or from 5 to 10 carbon atoms. $R^1$ and $R^2$ are independently selected in the same manner as described in the embodiment immediately above, and can be selected from the group consisting of: substituted and unsubstituted linear alkyls, branched alkyls, aryls, aromatics, and mixtures thereof. Likewise, $R^3$, $R^4$, and $R^5$ are independently selected from the group consisting of: non-reactive organic groups and hydrogen.

Further, hydride functional groups can be incorporated either into a terminal end of the molecule, or alternatively within the moleculer backbone, as shown in the previous two embodiments. Thus, in another embodiment, the sterically hindered hydride is located at the terminal end of a molecule in the crosslinking reagent, and can be represented by the general formula:

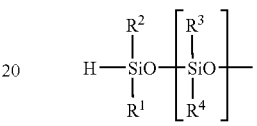

where $R^1$ and $R^2$ comprise a non-reactive organic group having 3 or more carbon atoms. In certain embodiments, the non-reactive organic group comprises less than 20 carbon atoms. In certain embodiments, the bulky organic group comprises less than about 20 carbon atoms. In various embodiments, the organic group comprises from 3 to 20, from 4 to 15 or from 5 to 10 carbon atoms. The selection of $R^1$ and $R^2$ is identical to that described in the previous embodiments, and $R^1$ and $R^2$ are independently selected from the group consisting of: substituted and unsubstituted linear alkyls, branched alkyls, aryls, aromatics, and mixtures thereof. Additionally, each respective $R^3$ and $R^4$ is independently selected from the group consisting of: non-reactive organic groups and hydrogen. In the present embodiment, the bulky organic substituent groups provide physical blocking of the hydride, however are attached to the same silicon atom to which the hydride is bonded.

As appreciated by one of skill in the art, any of the previously described embodiments of the sterically hindered silicon hydride molecules can be mixed with one another to form a mixture of different molecules, that form the crosslinking reagent, that will react with the unsaturated functional group on the siloxane reagent. Additionally, depending on the system design, more traditional crosslinking silicon hydride compounds (those that are non-sterically hindered) may be added in low concentrations to the crosslinking reagent to accelerate the crosslinking reaction rate. The % of hydride functional groups in the crosslinking reagent molecule of the present invention may vary from about 2% to about 98%. However, a preferred percentage of hydride functional groups in the crosslinking reagent molecule is from between about 2 to about 45%. Preferably, the crosslinking reagent is added to the one-component curing system at a concentration of about 1 to about 75 percent of the total weight, excluding fillers or additives.

As appreciated by one of skill in the art, the silicon hydrides employed in the single component addition cure polysiloxane systems may be non-sterically hindered traditional silicon hydride molecules, and thus, may be combined with sterically hindered siloxane reagents (having a sterically hindered unsaturated organic functional group).

Incorporation of bulky non-reactive organic side groups into the silicon hydride molecules of the crosslinking reagents of the present invention are created by polymerization performed in a conventional manner, as recognized by one of skill in the art. Such a silicon molecule, having the two bulky side group in near proximity to the hydride group, is preferably functionalized by incorporating a reactive functional group (e.g. epoxy, amine, mercapto, methacrylate/acrylate, acetoxy, chlorine; hydride or vinyl; or hydroxyl groups) to facilitate incorporation into the silicone based backbone by polymerization, such as by conventional methods known in the art. After the bulky non-reactive side groups are incorporated into the molecule, the newly formed sterically hindered silicon hydride can serve as the cross-linking reagent in the addition cure single component system.

An example of a sterically hindered hydride useful with the present invention is expressed by the nominal general SRU formula:

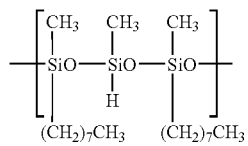

where the molecular backbone is siloxane, $R^1$ and $R^2$ bulky organic groups are selected to be octyl groups, and $R^3$, $R^4$, and $R^5$ are selected to be non-reactive methyl groups. Such a sterically hindered crosslinking reagent is commercially available as a 25–30% methylhydrosiloxane-octylmethylsiloxane copolymer available under the trade name HAM 301, sold by Gelest, Inc. of Tullytown, Pa.

Catalyst

The curing system according to the present invention further comprises a catalyst to facilitate the hydrosilylation crosslinking reaction between neighboring siloxane and crosslinking reagent chains at the respective functional group sites. Preferred catalysts according to the present invention comprise ruthenium (Rh), platinum (Pt), palladium (Pd), nickel (Ni), cobalt (Co), and mixtures thereof. Most preferred catalyst systems comprise Pt. Feasible catalyst systems that may be used for hydrosilylation include, for example: platinum carbonyl cyclovinylmethyliloxane complex used for elevated cures, such as SIP 6829 which is also commercially available from Gelest, Inc.; Rh(I) catalysts such as $(PPh_3)_3RhCl$ or $[(C_2H_4)_2RhCl]_2$, Ni catalysts, $(PPh_3)PdCl_2$, $Rh_2(OAc)_4$, $Ru_3(CO)_{12}$, and $Co_2(CO)_8$ and equivalents thereof. Preferably, catalyst is charged to the one-component curing system mixture at from about 0.05 to 1 weight percent of the total mixture (excluding any filler particles or other additives).

Additional Components

The present invention contemplates the addition of particles or inorganic fillers, including conductive particles, thus creating a matrix of the polysiloxane material (resin) having a plurality of particles distributed therein. Additionally, other compounds and additives known to one of skill in the art are frequently added to polysiloxane compounds and are contemplated by the present invention. Such additional additives may comprise antioxidants, such as sterically hindered type phenol antioxidants, for example, Vanox SKT, Vanox GT, Vanox 1320.

One important aspect of the present invention is that it provides the ability to process the material, well after the addition of all the reagents together in a single component system. The handling and flowability of the single component addition curing system is dependent on the rate of crosslinking once all the reagents (particularly the catalyst) are added. The degree of crosslinking, related to the rate of the crosslinking reaction, effects the viscosity of the mixture (where the degree of crosslinking is greater, the viscosity is greater). The amount of time that remains for handling is generally known as the "pot life", and in preferred embodiments of the present invention, the pot life is greater than one day (24 hours). In particularly preferred embodiments, the pot life is greater than 168 hours or a week. Preferred embodiments of the present invention provide pot lives extending for weeks or months. In accordance with the present invention, the retardation of the reaction rate is achieved primarily by the steric hindrance of the silicon hydride of the crosslinking reagent.

Methods

One method of making a polysiloxane polymer product by the present invention in a single component addition cure comprises: admixing a siloxane reagent having an unsaturated organic functional group for crosslinking, a crosslinking reagent having a silicon hydride functional group for crosslinking, wherein at least one of: the functional group of the siloxane reagent, the silicon hydride of the crosslinking reagent, or both, are sterically hindered, and a catalyst into a single component mixture. A crosslinking reaction is conducted between the siloxane and the crosslinking reagent. During the reaction, the sterically hindered functional group reduces a rate of the crosslinking reaction in the single component system, as compared to a comparative crosslinking reaction rate of a comparative non-sterically hindered organic functional group of a siloxane that is reacted with a non-sterically hindered silicon hydride functional group of a crosslinking reagent, having a more rapid reaction rate due to the lack of steric hindrance.

A polysiloxane co-polymer product is formed preferably at least about 24 hours after the admixing. Thus, the crosslinking reaction is preferably conducted for at least about 24 hours after admixing. In certain embodiments, a polysiloxane polymer product is formed after 168 hours (one week). By polysiloxane "product" it is meant that the polysiloxane material has substantially completed curing and is in a final crosslinked state (corresponding to a degree of crosslinking substantially similar to the desired % of crosslinking). The final form of the product corresponds to a physical phase that can no longer be worked or processed in an industrially practicable way, thus the physical phase is substantially solid or semi-solid phase. Thus, the present invention permits processing and working of the admixed one-component system prior to forming of the final polysiloxane product. As previously discussed, it is preferred that the one-component system is workable for at least 24 hours, in that it is in a semi-solid, viscous phase that permits processing. The workable mixture is then processed by conventional process means, including,: mixing, shearing, deforming, applying (e.g., by doctor blade), casting, laminating, extruding, pad printing, spraying or silk screening.

The rate of crosslinking reaction is dependent on the degree of steric hindrance, which is primarily related to the size of the adjacent bulky reactive substituent groups (as the physical size increases the rate of reaction decreases). Also, the rate of reaction is dependent on temperature and the crosslinking reaction rate is accelerated when temperature is raised. Thus, temperature may be used to control the rate of reaction to coincide with processing needs. Various embodiments of the present invention conduct the admixing and crosslinking reaction at ambient conditions. However, in alternate embodiments, the temperature may be varied to accelerate or slow the reaction rate as desired during manufacturing and processing. This may be particularly useful in embodiments where the activation energy is high for the reaction system, and the thermal energy serves to initiate the crosslinking reaction at the desired time. In this manner, the addition curing system of the present invention provides "on-demand" curing that can be controlled by temperature. Generally, such curing/crosslinking temperatures range from about 30° C. to about 250° C. Accordingly, in one embodiment, the conducting of the curing or crosslinking step comprises a curing initiating step, where the temperature of the reagents and catalyst mixture is increased to effect curing.

In alternate embodiments of the present invention, where a polysiloxane matrix is formed, a plurality of conductive particles are admixed into the single component addition curing system. The plurality of conductive particles are added in a range of from about 25 to about 75% of the total mixture depending on particle characteristics, including tendency to disperse in the matrix. It is preferred that the conductive particles are well mixed into the polymer mixture for even distribution. The polymer or matrix mixture can be blended or mixed by equipment known in the art, such as for example, a mixer (e.g. a Banbury® or Brabender® mixer), a speedmixer, kneader, a monoaxial or biaxial extruder (e.g. single-screw or twin-screw extruders).

Polysiloxane polymer films are useful as products in such technologies as polymer-absorption chemiresistor sensors, where a polymer film in a sensor is exposed to a surrounding atmosphere containing target analytes (chemical compounds). An electrical charge is applied across the polymer film. The polymer absorbs target analytes and this results in a volumetric change of the film, and hence the electrical resistance of the film. Further, conductive particles may be distributed throughout the polymer film to enhance the sensitivity to resistance changes in the material when the volume of the polymer changes. The mixture of all reagents is applied to the sensor probe while still workable. The mixture is preferably applied to the sensor surface by conventional application means (e.g. doctor blade, casting, lamination, extrusion, pad printing, spraying, or silk screening).

It was observed that when prior art siloxane addition curing systems were used, unacceptable increases in resistance occurred where there was a significant duration of time lapsed after mixing but before application to the matrix mixture to the sensor. This increase in resistance may be due to a stiffer (more viscous and highly crosslinked) polymer material that likely resulted in a poor interface with the sensor components. The present invention improves siloxane polymer matrix film performance in a sensor probe environment, because the matrix mixture is workable for a longer duration after admixing the reagents, thus improving the interface between the polymer matrix and sensor probe by having a relatively low viscosity during the application process.

EXAMPLE 1

In accordance with the present invention, a Sample is prepared by charging a Braebender mixer with vinylmethylsiloxane-octylmethylsiloxane-dimethylsiloxane copolymer at 75.2 g, 24.8 g of 25–30% methylhydrosiloxane-octylmethylsiloxane copolymer (a crosslinking reagent having a sterically hindered silicon hydride) commercially available under the trade name HAM 301 sold by Gelest, Inc., 0.45 g of platinum carbonyl cyclovinylmethyliloxane catalyst, available under the brand name SIP 6829 sold by Gelest, Inc., and 56.1 g of carbon black available under the trade name Asahi 15HS by the Asahi Carbon Co., Ltd. of Japan. The reagents are mixed for 15 minutes at 25° C. minutes to form a single component matrix mixture.

The sterically hindered silicon hydride crosslinking reagent in the addition curing systems of the present invention demonstrate significantly longer pot life durations than the prior art. The present invention thus makes it feasible to admix all addition cure polysiloxane precursors (siloxanes having an unsaturated hydrocarbon group, crosslinkers with a hydride, and the catalyst) together into a single component addition cure system, that has an industrially feasible pot life, permitting necessary processing for significant time durations after admixing, but prior to the final crosslinked polysiloxane product formation. Thus, the present invention provides an economical way to form polysiloxane compounds through a feasible and effective one-component addition cure system.

The description of the invention and examples provided herein is merely exemplary in nature and, thus, variations that do not depart from the gist of the invention are intended to be within the scope of the invention. Such variations are not to be regarded as a departure from the spirit and scope of the invention.

What is claimed is:

1. A single component addition curable polysiloxane system comprising:
   (a) a siloxane reagent having at least one unsaturated organic functional group for a crosslinking reaction;
   (b) a crosslinking reagent comprising a silicon hydride group for said crosslinking reaction, wherein said silicon hydride of said crosslinking reagent is sterically hindered, wherein said crosslinking reagent is represented by a nominal formula selected from the group consisting of:

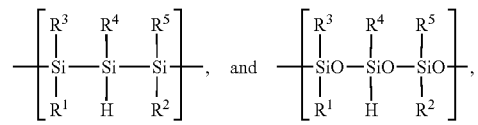

wherein $R^1$ and $R^2$ each comprise a non-reactive alkyl group having 4 or more carbon atoms and each respective $R^3$, $R^4$, and $R^5$ is each independently selected from the group consisting of: a non-reactive organic group and hydrogen; and
   (c) a catalyst, wherein the single component addition curable polysiloxane system has flowability at ambient conditions prior to said crosslinking reaction.

2. The addition curable polysiloxane system according to claim 1, wherein $R^1$ and $R^2$ are independently selected from the group consisting of: butyl, pentyl, hexyl, heptyl, octyl, nonyl, and decyl.

3. The addition curable polysiloxane system according to claim 1, wherein said catalyst comprises a metal selected from the group consisting of:
   ruthenium (Rh), platinum (Pt), palladium (Pd), nickel (Ni), cobalt (Co), or mixtures thereof.

4. The addition curable polysiloxane system according to claim 1, wherein said catalyst comprises a compound selected from the group consisting of: $(PPh_3)_3RhCl$, $[(C_2H_4)_2RhCl]_2$, $(PPh_3)PdCl_2$, $Rh_2(OAc)_4$, $Ru_3(CO)_{12}$, $Co_2(CO)_8$, and platinum carbonyl cyclovinylmethylsiloxane.

5. The addition curable polysiloxane system according to claim 1, wherein said siloxane reagent comprises a copolymer of polyoctylmethyldimethyl-silicone.

6. The addition curable polysiloxane system according to claim 1, wherein said siloxane reagent comprises a vinylmethylsiloxane-octylmethylsiloxane-dimethylsiloxane copolymer, wherein said unsaturated hydrocarbon functional group of said vinylmethylsiloxane-octylmethylsiloxane-dimethylsiloxane copolymer comprises a vinyl group, said crosslinking reagent comprises said silicon hydride group having a formula of

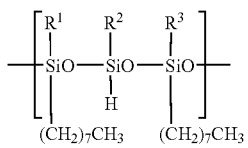

wherein $R^1$, $R^2$, and $R^3$ are each independently selected from the group consisting of non-reactive organic groups and hydrogen, and said catalyst comprises platinum carbonyl cyclovinylmethylsiloxane.

7. The addition curable polysiloxane system according to claim 1, further comprising a plurality of conductive particles.

8. The addition curable polysiloxane system according to claim 1, wherein said unsaturated organic functional group of said siloxane reagent is sterically hindered.

9. A method of making a polysiloxane polymer by a single component addition cure, the method comprising:
a) admixing a siloxane reagent comprising a siloxane polymer having a functional group for crosslinking, a crosslinking reagent having a silicon hydride functional group for crosslinking that is sterically hindered, and a catalyst, into a single component mixture; and wherein, said crosslinking reagent is represented by a nominal formula selected from the group consisting of:

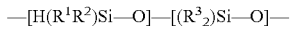

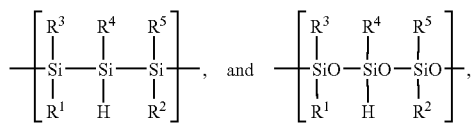

wherein $R^1$ and $R^2$ each comprise a non-reactive alkyl group having 4 or more carbon atoms and each respective $R^3$, $R^4$, and $R^5$ is each independently selected from the group consisting of: a non-reactive organic group and hydrogen; and
b) conducting a crosslinking reaction between said siloxane reagent and said crosslinking reagent, wherein said sterically hindered functional group reduces a rate of said crosslinking reaction, as compared to a comparative crosslinking reaction rate of a comparative non-sterically hindered functional group of a siloxane reacted with a non-sterically hindered silicon hydride functional group, wherein said single component mixture has flowability at ambient conditions prior to said crosslinking reaction.

10. The method according to claim 9, wherein said conducting step is completed at least about 24 hours after said ad mixing.

11. The method according to claim 9, wherein said conducting step is completed at least about one week after said admixing.

12. The method according to claim 9, wherein after said admixing, a processing step where said single component mixture undergoes at least one process selected from the group consisting of: shearing, mixing, applying, deforming, casting, laminating, extruding, pad printing, spraying and silk screening.

13. The method according to claim 12, wherein said processing step comprises applying said single component mixture to a sensor probe in a chemiresistor sensor.

14. The method according to claim 9, wherein said conducting step is initiated by increasing the temperature of said single component mixture.

15. The method according to claim 14, wherein said temperature is increased to from about 30° C. to about 250° C.

16. A method of making a sensor film, the method comprising:
a) admixing a siloxane reagent having at least one unsaturated organic functional group for crosslinking, a crosslinking reagent comprising a silicon hydride functional group for crosslinking that is sterically hindered, a catalyst, and a plurality of conductive particles into a matrix mixture, wherein said matrix mixture has flowability after said admixing for at least about 24 hours;
(b) applying said matrix mixture on a sensor probe;
c) reacting said siloxane reagent with said crosslinking reagent in a crosslinking reaction, wherein said sterically hindered functional group on said crosslinking reagent reduces a rate of said crosslinking reaction in said matrix mixture, as compared to a reaction rate of a comparative non-sterically hindered functional group of a siloxane reacted with a non-sterically hindered silicon hydride functional group of a crosslinking reaction;
and
d) forming a polysiloxane matrix product.

17. The method according to claim 16, wherein said silicon hydride of said crosslinking reagent is represented by a nominal formula selected from the group consisting of:

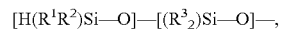

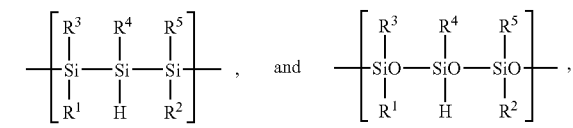

wherein $R^1$ and $R^2$ each comprise a non-reactive organic group having 3 or more carbon atoms that are independently selected from the group consisting of: linear alkyls, branched alkyls, aryls, aromatics, and mixtures thereof; and where $R^3$, $R^4$, and $R^5$ is each independently selected from the group consisting of: a non-reactive organic group and hydrogen.

18. The method according to claim 17, wherein $R^1$ and $R^2$ are independently selected from the group consisting of: butyl, pentyl, hexyl, heptyl, octyl, nonyl, and decyl.

19. The method according to claim 17, wherein $R^1$ and $R^2$ are independently selected from the group consisting of: propyl, butyl, pentyl, hexyl, heptyl, octyl, nonyl, decyl, phenyl, alkylphenyl, cyclopentyl, and phenylpropyl.

20. The method according to claim 17, wherein $R^1$ and $R^2$ are independently selected from the group consisting of: butylated aryloxypropyl, N-pyrrolidonepropyl, cyanopropyl, benzyltrimethyl ammonium chloride, and hydroxyalkyl.

21. A single component addition curable polysiloxane system comprising:
  (a) a siloxane reagent having at least one unsaturated organic functional group for a crosslinking reaction;
  (b) a crosslinking reagent comprising a sterically hindered silicon hydride group for said crosslinking reaction, wherein said sterically hindered silicon hydride group is a terminal group and is represented by the formula:

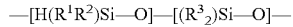

$$—[H(R^1R^2)Si—O]—[(R^3{}_2)Si—O]—$$

wherein $R^1$ and $R^2$ each comprise a non-reactive organic group having 3 or more carbon atoms that are independently selected from the group consisting of: linear alkyls, branched alkyls, aryls, aromatics, and mixtures thereof; and wherein each respective $R^3$ is selected from the group consisting of: non-reactive organic groups and hydrogen; and
  (d) a catalyst.

22. The addition curable polysiloxane system according to claim 21, wherein $R^1$ and $R^2$ are independently selected from the group consisting of: propyl, butyl, pentyl, hexyl, heptyl, octyl, nonyl, decyl, phenyl, alkylphenyl, cyclopentyl, and phenylpropyl.

23. The addition curable polysiloxane system according to claim 21, wherein $R^1$ and $R^2$ are independently selected from the group consisting of: butylated aryloxypropyl, N-pyrrolidonepropyl, cyanopropyl, benzyltrimethyl ammonium chloride, and hydroxyalkyl.

* * * * *

UNITED STATES PATENT AND TRADEMARK OFFICE
CERTIFICATE OF CORRECTION

PATENT NO. : 7,211,637 B2
APPLICATION NO. : 10/860198
DATED : May 1, 2007
INVENTOR(S) : Edward J. Blok It is certified that error appears in the above-identified patent and that said Letters Patent is hereby corrected as shown below:

Column 16,
Line 6, claim 10, "ad mixing" should be --admixing--.

Signed and Sealed this

Thirty-first Day of March, 2009

JOHN DOLL
*Acting Director of the United States Patent and Trademark Office*